United States Patent [19]

Osborn

[11] 4,255,814

[45] Mar. 10, 1981

[54] SIMULCAST TRANSMISSION SYSTEM

[75] Inventor: James L. Osborn, Arlington Heights, Ill.

[73] Assignee: Motorola, Inc., Schaumburg, Ill.

[21] Appl. No.: 47,508

[22] Filed: Jun. 11, 1979

Related U.S. Application Data

[63] Continuation-in-part of Ser. No. 815,885, Jul. 15, 1977, abandoned.

[51] Int. Cl.³ .............................................. H04B 1/00
[52] U.S. Cl. ...................................... 455/51; 455/53; 455/57
[58] Field of Search ...................................... 455/8–10, 455/15, 16, 33, 49–53, 57; 370/100, 108

[56] References Cited

U.S. PATENT DOCUMENTS

| | | | |
|---|---|---|---|
| 1,490,958 | 4/1924 | Brown | 455/50 |
| 2,509,237 | 5/1950 | Labin et al. | 455/57 |
| 2,991,353 | 7/1961 | Barnes | 455/51 |
| 3,310,741 | 3/1967 | Ultermark et al. | 455/54 |

OTHER PUBLICATIONS

An Engineering Application Note Entitled "Delaying AF Signals with MOS Delay-lines TCA 350" by ITT Semiconductors, 1974 Edition.
"Undulating Field Kicks Charge Across IC", Design News, p. 75, Sep. 23, 1974.

Primary Examiner—Jin F. Ng
Attorney, Agent, or Firm—James W. Gillman; James S. Pristelski

[57] ABSTRACT

A system of the type wherein transmissions of the same information are simultaneously broadcast by spatially removed transmitter sites. A control center establishes transmission links to the transmitter sites. The center includes electronic storage which supplies the required time delay for each signal applied over a predetermined link to assure phase coherency of overlapping transmissions. Upon the establishment of a new link, a new set of time delays is recalled from memory and used to program a bucket brigade to thereby provide the required delay to signals carried over the link.

2 Claims, 11 Drawing Figures

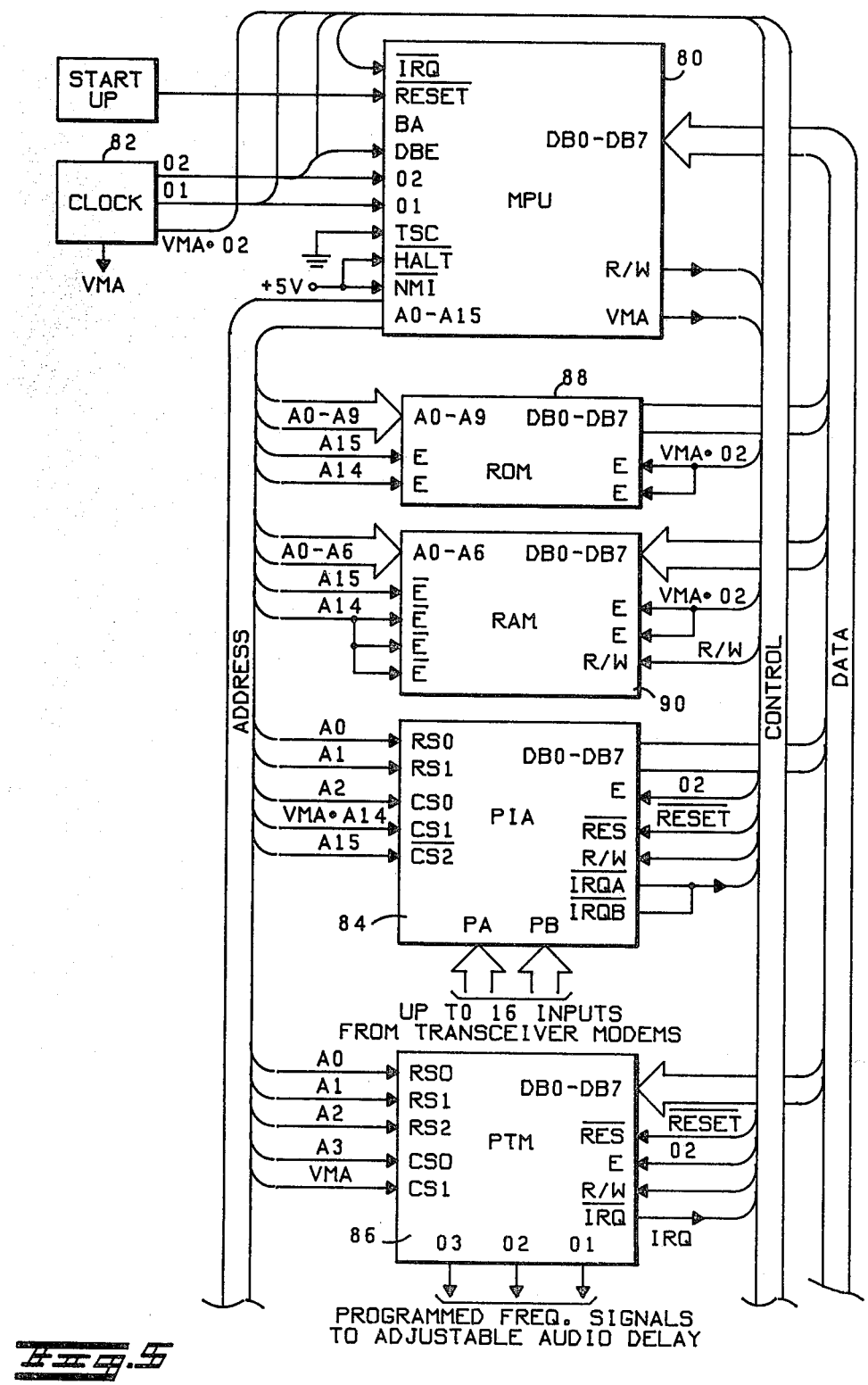

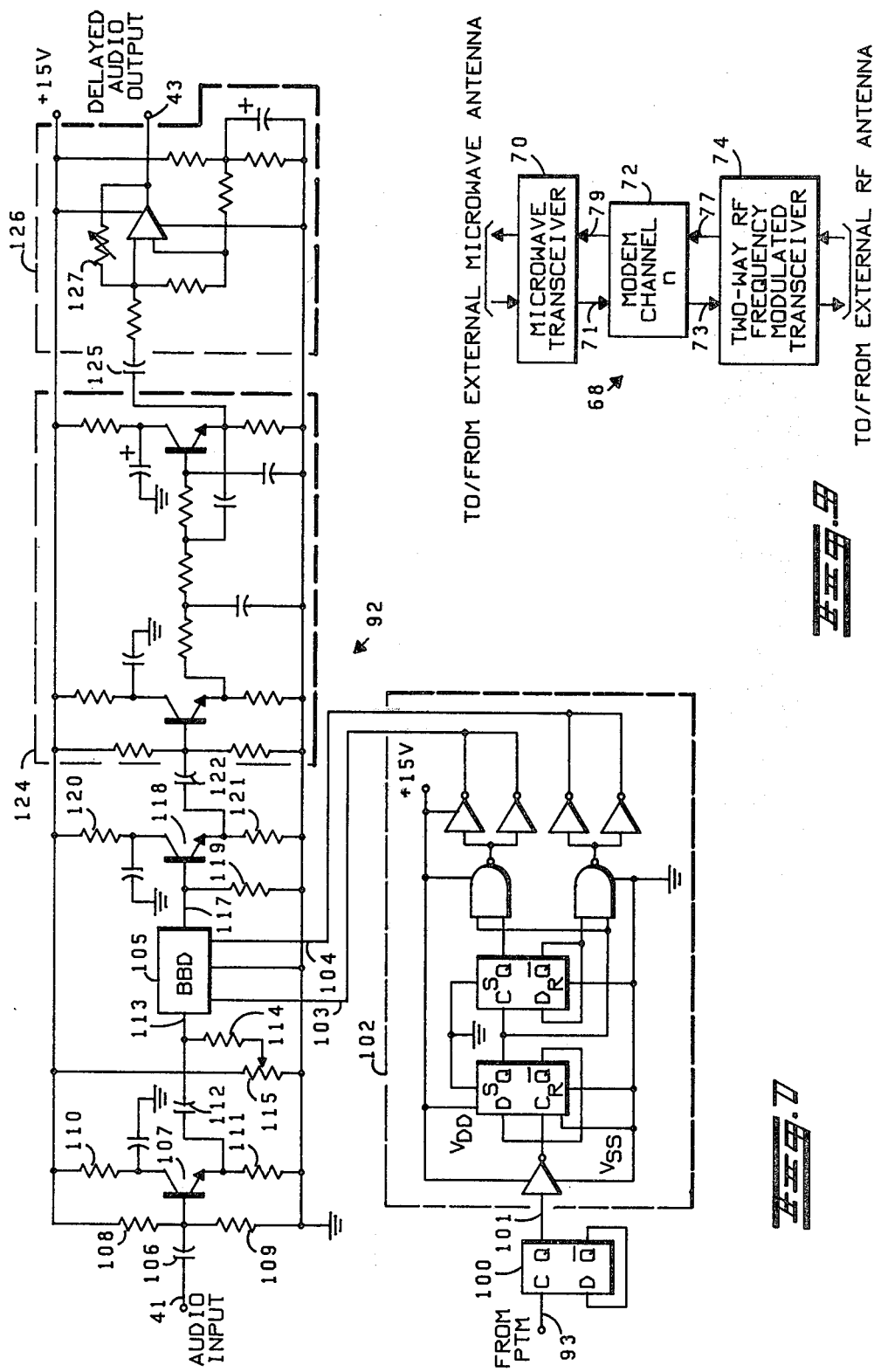

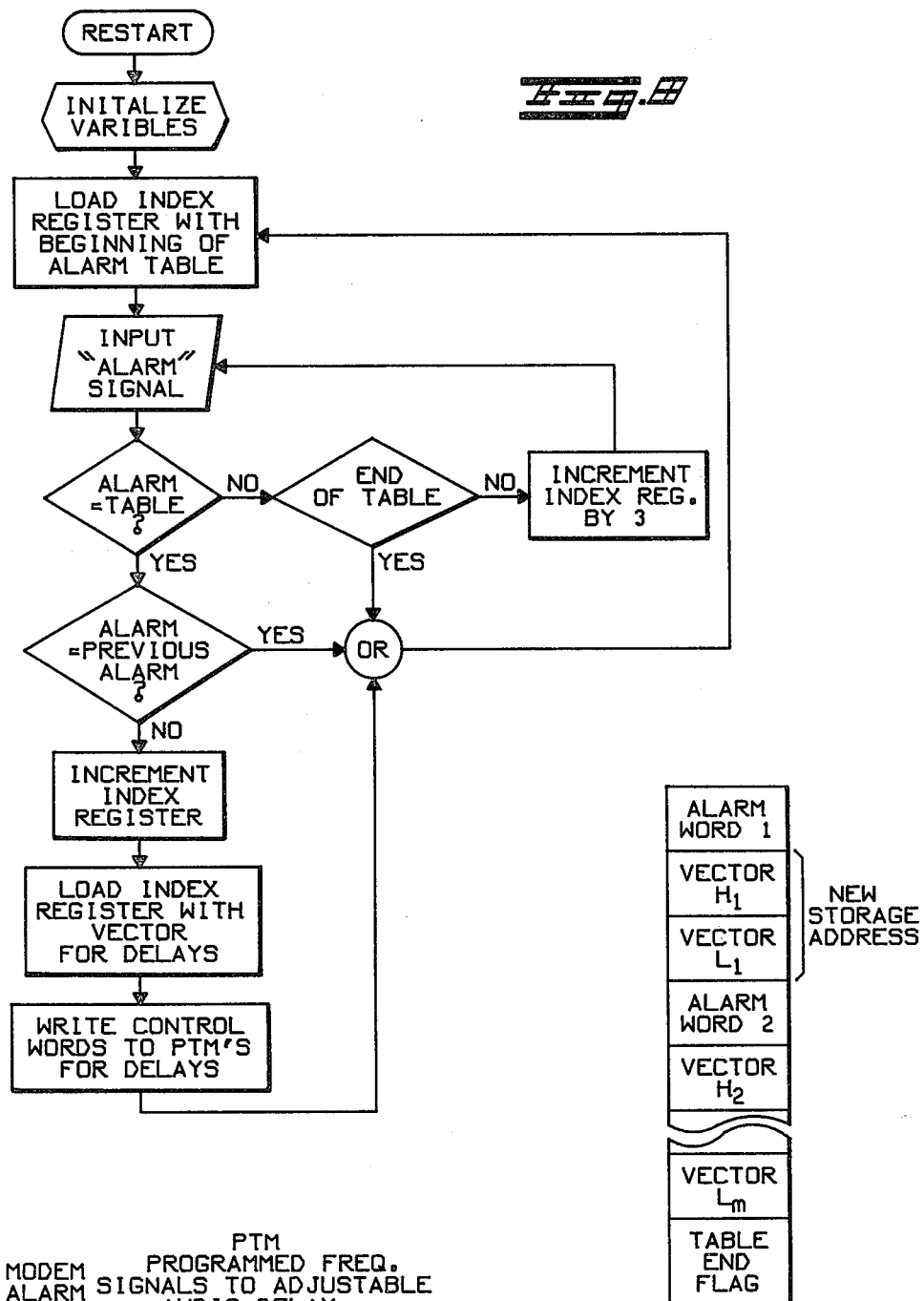

4,255,814

SIMULCAST TRANSMISSION SYSTEM

CROSS-REFERENCE TO RELATED APPLICATION

This application is a continuation in part of a copending patent application Ser. No. 815,885, filed July 15, 1977, now abandoned.

BACKGROUND OF THE INVENTION

This invention pertains to the radio communication art and, more particularly, to a system which controls the simultaneous transmission of information by a plurality of transmitter sites.

Simultaneous broadcast, or simulcast systems, are well known in the radio transmission art. In such systems, a plurality of remotely located transmitters simultaneously broadcast the identical audio, or information signals at a particular carrier frequency. This provides maximum signal coverage, especially in mountainous regions where large radio coverage shadows exist. A problem with such systems occurs when a receiving site is positioned between two transmitting sites such that it receives equal strength carrier signals from each. In this situation it is important that the audio message from the two transmitters be phase coherent, otherwise message reception may be lost.

The prior art has compensated for this known problem by establishing the following system. The audio signal to be simulcast is transmitted from a control center to the various remotely located transmitters. This is usually accomplished with multiplexed microwave equipment. The message includes an individual audio channel for each remotely located transmitter, with the audio on that channel predeterminedly delayed by lumped, passive delay units, known as "bricks," located in the control center. A standard brick includes lumped component circuitry which provides either 50 or 100 microsecond units of delay to audio signals. Thus, dependent upon the particular link to be set up over to the transmitter sites, a brick provided time delay may be hard wired into each transmission link, whereby the overlapping coverage zones between transmitter sites are in audio phase coherency.

As simulcast systems develop, an increasing number of remote stations are provided, whereby an increasing number of possible links between points become possible. Quite often, due to rain or some other form of interference, or an equipment failure, a link may be broken due to interruption between transmitters and, to maintain information transmission, a new link must be established. With prior art systems utilizing bricks, the establishment of new links requires substantial hand wiring of the system which, of course, is quite time consuming. Moreover, such prior art lumped constant type systems are expensive and require substantial space to house.

SUMMARY OF THE INVENTION

It is an object of this invention, therefore, to provide a simulcast transmission system which automatically provides proper time delay to information signals over each transmission link.

It is a further object of the invention to provide the above described simulcast transmission system in an inexpensive and space conserving form.

Briefly, according to the invention, the inventive simulcast transmission system is capable of simultaneous transmission of information signals. The system comprises a plurality of simulcast transmitter sites, with each site being located at a predetermined position. Each site includes means for receiving and retransmitting information signals. The control means is provided for establishing transmission links among the simulcast transmitter sites. Included within the control means are means for receiving information signals and predeterminedly time delaying the information signals transmitted over a link such that simultaneous transmissions from overlapping coverage area simulcast transmitter sites are in phase coherency. The control means further comprises means for storing the necessary time delay required for each link and for automatically recalling the stored time value and providing the required time delay to signals passed over newly established links.

BRIEF DESCRIPTION OF THE DRAWINGS

FIG. 6 is a block diagram further illustrating the adjustable audio delay block in FIG. 1.

FIG. 7 is an electrical schematic diagram further illustrating the circuitry for one of the adjustable audio delay channels in FIG. 6.

FIG. 8 is a logic flow diagram used by the microprocessor in FIGS. 4 and 5 to send delay vector information from storage to the programmable timer modules in FIGS. 4 and 5 in accordance with the alarm signals received by the peripheral interface adapters from the modem channels in FIG. 2.

FIG. 8A is a block diagram illustrating the serial arrangement of alarm words and associated delay vectors stored in the storage of FIGS. 1 and 4.

FIG. 8B is a simplified illustrative table of sets of frequency outputs from two programmable timer module outputs to control the audio delays in two modem channels of the transceiver in FIG. 1 in response to differing modem alarm signal states received by the peripheral interface adapters of FIGS. 4 and 5.

FIG. 9 is a block diagram illustrating a typical transceiver for one of the spatially removed transmitter sites.

DESCRIPTION OF THE PREFERRED EMBODIMENT OF THE INVENTION

I. In General

Figure 1:
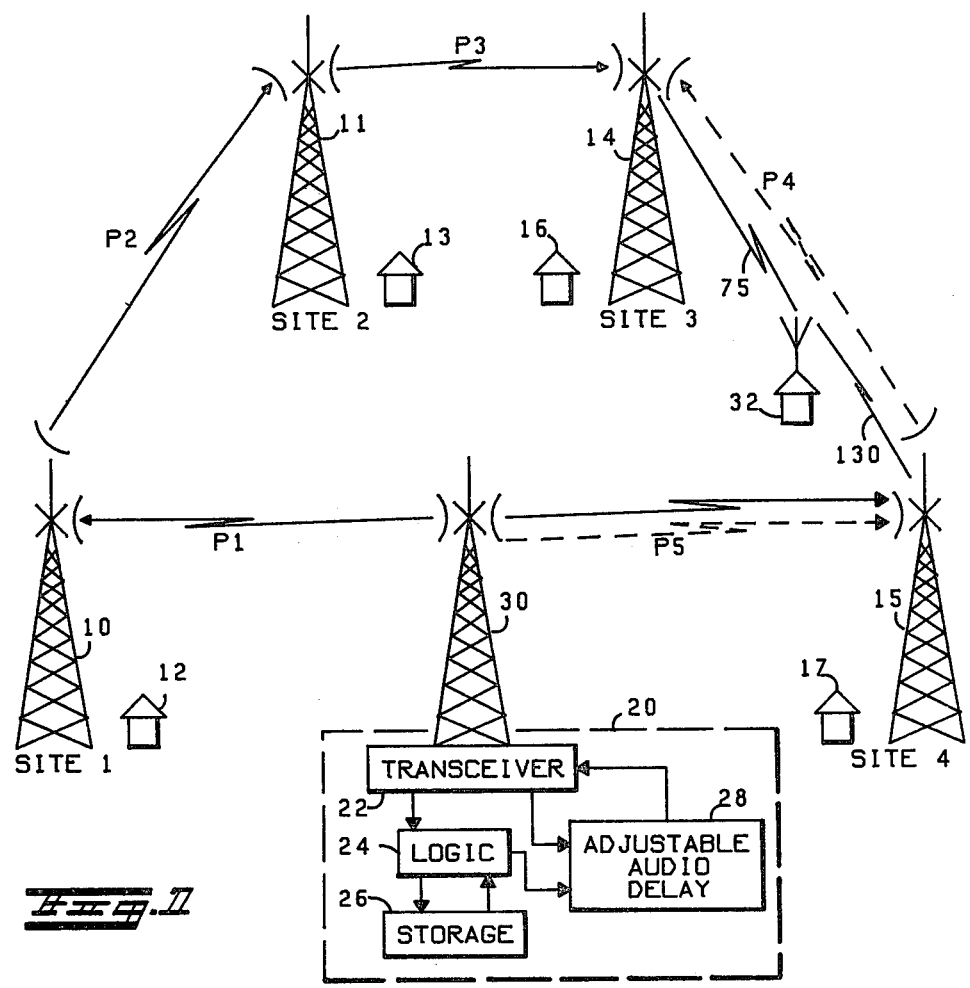
FIG. 1 is a diagrammatic view of the simulcast transmission system of the present invention including a control center antenna for establishing microwave transmission links to spatially removed transmitter sites with the control center circuitry shown in block diagram form.

Referring to FIG. 1, the system includes four simulcast transmission sites. Referring to site 1 for illustrative purposes, each site includes a tower, such as tower 10 for site 1, with both communication transmitter and microwave antennas. The signals are received via the microwave link, the appropriate audio channel designated for the site is decoded within the control house 12, and then appropriately retransmitted via the simulcast transmitter in control house 12 out over its antenna.

It is contemplated in this, the preferred embodiment of the invention, that each simulcast transmission site be of the microwave type, i.e. receiving from and transmitting to other sites, including the control site, over a microwave link, and converting its own message signal to frequencies appropriate for communication over conventional two-way radio equipment, and that the sites be located to provide optimum coverage to a given area. Such multiple simulcast sites are commonly used in locations wherein direct line reception from a single tower becomes difficult, as in mountainous regions.

Overall control of the simulcast transmission sites is provided at the control center 20. Located within the control center 20 is a transceiver 22, logic circuitry 24, storage circuitry 26 and adjustable audio delay circuit 28. Transmissions to the transceiver 22 are picked up and transmitted over the control center antenna 30.

In operation, the control center 20 establishes the transmission links over the microwave system. In the conventional manner, information signals broadcast from the control center 20 over its antenna 30 are received by each simulcast transmission site and are then either decoded and re-broadcast to receivers in the area or are relayed to subsequent sites in the link. Thus, along with the information signal broadcast by the control center 20, a message signal is sent on a signalling channel to thereby control operation of the simulcast sites.

For example, the control center 20 might transmit an appropriate message to establish a link between sites 1, 2 and 3 over paths P1, P2 and P3. Thus, contained within the message to site 1 on path P1 would be not only the information signal to be broadcast by site 1 but also the information signals which are to be passed over path P2 to site 2 and over paths P2 and P3 to site 3. In turn, site 2 would receive the signal over path P2, broadcast its own information signal, and relay over path P3 the information signal correponding to site 3. Thus, the information signal broadcast by each site may be individually controlled by the control center 20.

Assume, for purposes of illustration, that the control center 20 has established a first link comprising sites 1, 2 and 3 over paths P1, P2 and P3, and a second link to site 4 over path P5. If a receiver, such as receiver at site 32 is located in the overlapping coverage between sites 3 and 4 such that neither of the simulcast transmission sites captures the receiver site 32, it is imperative that the information signal from simulcast sites 3 and 4 be in phase, otherwise there will be a loss of intelligibility. Since the information signal ultimately broadcast by site 3 must travel over paths P1, P2 and P3, whereas the information signal broadcast over site 4 travels only over path P5, it is apparent that the information signal to site 4 must experience an appropriate time delay if the combined signal at receiving site 32 is to be coherent. Therefore, it is a function of the control center 20 to provide appropriate time delays to the information signals sent out over each link.

This control is automatically provided by the instant invention via operation of the logic 24, storage 26 and adjustable audio delay 28. The logic circuitry 24 assigns the desired links for the system. In the case of the above discussed example, the logic circuitry 24, broadcasting over its transceiver 22 and antenna 30, sends an appropriate message signal to sites 1, 2 and 3 thereby establishing these sites as one link. Correspondingly, an appropriate signal would be sent to site 4, thereby establishing a second link. Once the logic 24 determines the desired links, it recalls from the storage circuitry 26 the desired audio delays necessary to provide phase coherency to receivers located between simulcast transmission sites. That is, stored within the storage circuitry 26 are the time delays required for coherency transmission over any possible link established by the logic circuitry 24. Once the desired audio delays have been recalled from the storage 26, the logic then programs an adjustable audio delay device 28 which, in this the preferred embodiment of the invention, is comprised of a bucket brigade device. In response to the control provided by the logic 24, the adjustable audio delay device 28 precisely delays the audio or information signal which is to be broadcast by each simulcast transmission site by the exact value recalled from the storage circuitry 26. Thus, corresponding to the above given example, the storage circuitry 26, in response to the logic 24 setting up a first link comprising paths P1, P2 and P3 and a second link comprising path P5 would thereby delay the information signal supplied to site 4 over path 5 by the precise amount such that a receiver at site 32 located between sites 3 and 4 would receive phase coherent information signals. It should be observed that if the receiver site 32 should relocate to a position intermediate of sites 2 and 3, it becomes imperative that the information signal as supplied by the control center 20 to site 2 be delayed to account for transmission lag over path P3 thereby assuring that signals received in the overlapping coverage between sites 2 and 3 be phase coherent. It is, therefore, desirable to establish a separate microwave audio channel to each simulcast site. The same analysis is true for the signals applied to sites 1 and 2.

Once the logic circuitry 24 establishes the simulcast transmission links, it is possible that due to a weather disturbance, or the failure of one of the transmission sites, a particular link will be broken. For example, with respect to the above described example, it is possible that due to a weather disturbance in path P3, the link between sites 2 and 3 may be broken. Once this happens, site 3 would transmit an alarm message which would be relayed over the remaining sites back to the control center 20. Receipt of the alarm message would cause both the logic 24 and transceiver to establish a new link to site 3 such as, for example, the paths P5–P4 shown in dotted lines on the attached FIG. 1. Since path P5–P4 is shorter than the path P1–P2–P3, the information signal broadcast over site 3 phase leads that over the previously established path. Thus, if corrections are not made to the time delays over the links, the signals received by the receiver at site 32 would be incoherent.

To compensate for this, once the logic 24 establishes the new path, it recalls from storage 26 the time delays required to provide phase coherency over the new links. Thus, with respect to the above example, the storage 26 would establish a shorter delay to information signals over path P5 to site 4 for rebroadcast than it had with the previously established links. Thus, the adjustable audio delay 28 would be reprogrammed to provide the new time delays and phase coherency would be maintained.

II. In Detail

Figure 2:
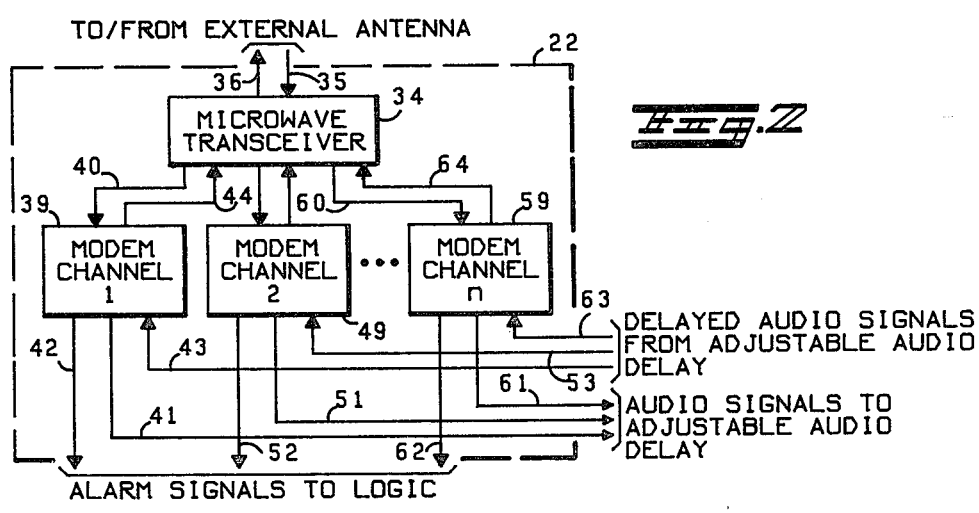
FIG. 2 is a block diagram further illustrating the transceiver block in FIG. 1.

The transceiver 22 in control center 20 associated with control center antenna 30 is shown in greater detail in FIG. 2. Transceiver 22 includes a microwave transceiver 34 for receiving and transmitting microwave signals to and from an external microwave antenna on control center tower 30. A suitable microwave transceiver 34 is commercially available from a number of sources including Motorola, Inc., of Schaumburg, Ill., as Model No. MR90. Microwave transceiver 34 receives and transmits a base-band signal illustrated in FIG. 3 about a center frequency $f_c$. It will be readily appreciated by those skilled in the art that the center frequencies associated with the transmission and reception of information by microwave transceiver 34 may be a common center frequency or different center frequencies. A considerable range of microwave frequencies may be employed, for example, 960 MHz, 2 GHz, 6 GHz, or 12 GHz.

Figure 3:
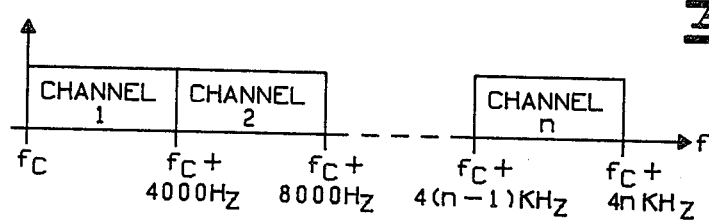
FIG. 3 is a graphic diagram of a frequency base-band about a microwave center frequency associated with the microwave transceivers in FIGS. 2 and 9.

As further shown in FIG. 3, the frequency base-band about microwave center frequency $f_c$ includes a plurality of channels for audio information which may be, for example, about 4 KHz apart. That is, channel 1 is between the center frequency of $f_c$ and the frequency $f_c+4$ KHz and channel n is spaced between the frequencies $f_c+4(n-1)$ KHz and $f_c+4n$ KHz. Microwave transceiver 34 demodulates this composite base-band signal in FIG. 3 and supplies the demodulated signal to a plurality of modems, one modem at the control center 20 for each of the audio channels employed in the simulcast system which will, in general, include n channels. Thus, a modem 39 for channel 1 receives the demodulated composite base-band signal of FIG. 3 on a line 40 from microwave transceiver 34 and decodes and filters the information contained in the base-band signal to provide the audio signal contained in channel 1 on an output line 41. Modem 39 for channel 1 also provides an alarm output signal on a line 42 to the logic 24 which indicates a loss of communication with a corresponding modem at one of the spatially removed sites 1-4 to indicate that a particular link in the simulcast system has been broken. Modem 39 is also capable of receiving an input audio signal, as on an input line 43 and encoding such input audio information to the appropriate band for channel 1 and supplying such encoded information to microwave transceiver 34 on a modem output line 44.

Operation of other modems associated with microwave transceiver 34 is similar. For example, a modem 49 for channel 2 may receive the same composite base-band signal as modem 39, but will decode those audio signals within channel 2 between 4 KHz and 8 KHz to supply the decoded audio signals on an output audio line 51 and will also supply an alarm signal on an output line 52 which indicates loss of a link with a corresponding modem for channel 2 at one of the transmission sites 1-4 in FIG. 1. Modem 49 for channel 2 will also encode any audio information on an input line 53 to supply microwave transceiver 34 with the audio information on line 53 within the encoded frequency band of 4 to 8 KHz for channel 2. In a similar manner, a modem 59 for channel n will decode the composite base-band signal of FIG. 3 to supply the audio information contained within channel n, which is between $4(n-1)$ KHz and $4n$ KHz in the demodulated base-band signal on an input line 60 from transceiver 34. Modem 59 also encodes any input audio signals into the channel n frequency band and supplies such encoded audio signals to transceiver 34 via a line 64. Modem 59 similarly has an output alarm line 62 to signal loss of a communication link with a corresponding modem for channel n at one of the sites 1-4.

Modems 39, 49 and 59 suitable for use with microwave transceiver 34 may be obtained from a variety of vendors, for example, from Motorola, Inc., of Schaumburg, Ill., as Model No. MC400.

The communications equipment 68 at one of the control houses 12, 13, 16 or 17 associated with respective spatially removed antenna towers, 10, 11, 14 or 15 is shown in block form in FIG. 9. A microwave transceiver 70 receives the microwave signal from microwave transceiver 34 in control center 20 which is demodulated from the center frequency and presented to a modem 72 associated with channel n via a line 71. Modem 72 in turn decodes the audio information contained within channel n which is presented to a two-way RF frequency modulated transceiver 74 via a line 73. RF transceiver 74 remodulates the audio signal on line 73 from channel n to an RF signal, for example to 150 MHz, to an external antenna. For example, in FIG. 1 if the communications equipment 68 of FIG. 9 is located at site 3, RF transceiver 74 may send an RF frequency modulated signal indicated by the reference numeral 75 in FIG. 1 to a receiver at site 32. The receiver at site 72 may also transmit RF frequency modulated signals back to the RF antenna at site 3 which are demodulated by RF transceiver 74 to an audio signal on an output line 77 to modem 72. Modem 72 in turn encodes the audio signal on line 77 to the frequencies within the band for channel n in FIG. 3 above center frequency $f_c$. Modem 72 supplies such encoded audio information to microwave transceiver 70 via a line 79, and microwave transceiver 70 modulates the information contained within channel n to a microwave frequency for transmission by a microwave antenna at site 3 back to the control center tower 30 via some of the microwave links P1-P5. Of course, audio signals may also originate at control center 20, in addition to site 32, as from a dispatcher.

Microwave transceiver 70 at one of the remote spatially removed sites 1-4 may be similar to microwave transceiver 34 in control center 20, and modem 72 for channel n may also be similar to modem 59 for channel n in control center 20. Two-way frequency modulated transceiver 74 may be any one of a number of commercially available RF frequency modulated transceivers.

Figure 4:
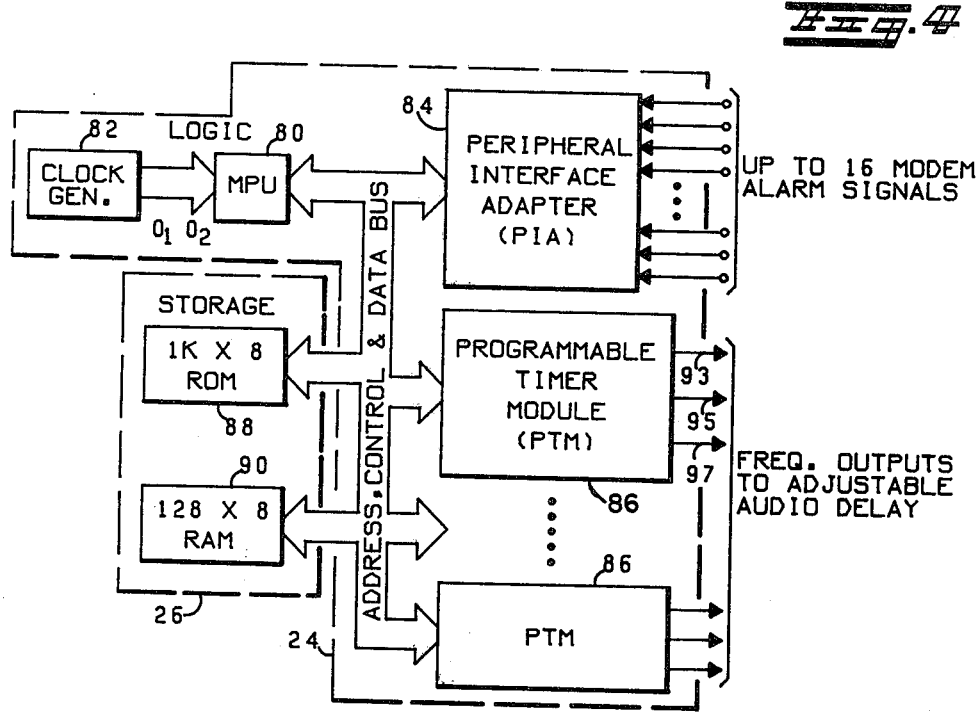
FIG. 4 is a block diagram further illustrating the storage and logic blocks in FIG. 1.

The logic 24 and storage 26 within control center 20 are illustrated in greater detail in FIG. 4. Logic 24 includes a microprocessor unit (MPU) 80 which receives two clock phases 01 and 02 from a clock generator 82. Logic 24 further includes at least one peripheral interface adapter (PIA) 84 and at least one programmable timer module (PTM) 86 which interface with MPU 80 via address, control and data buses. The address, control and data buses also interface with storage 26, which includes a 1K by 8-bit read-only memory (ROM) 88 and 128 by 8-bit random access memory (RAM) 90. These components of logic 24 and storage 26 preferably comprise a compatible logic and storage system such as that commercially available from Motorola Semiconductor Products, Inc., of Austin, Tex. 78721, as Part Nos. MC6800 for MPU 80, MC6871 for clock generator 82, MC6821 for PIA 84, MC6840 for PTM 86, MCM2708 for ROM 88 and MCM6810 for RAM 90.

PIA 84 is capable of receiving up to 16 modem alarm input signals directly from output lines 42, 52 and 62 of respective modems 39, 49, 59 of transceiver 22 in FIG. 2. Alternatively, interfacing logic may be provided between the alarm signal outputs of modems 39, 49 and 59 and the input terminals of PIA 84 if so desired. If the n channels total more than 16, additional PIA's 84 may be added to accommodate the number of modem channels utilized in the simulcast system.

As previously discussed, when any microwave link is lost, the alarm signals from modems 39, 49 and 59 will change in logic state which PIA 84 will provide to MPU 80. As seen in the flow diagram in FIG. 6, MPU 80 loads an internal memory indexing register with the beginning location of an alarm table shown in FIG. 8A and compares this alarm word as stored in memory to the alarm signal or condition from PIA 84. MPU 80 continually searches through the alarm table in FIG. 8A. Upon locating the same alarm word as provided by PIA 84, MPU 80 will load the index register with, for example, vectors H1 and L1 for alarm word 1 from ROM 88 which are pre-programmed into ROM 88 in accordance with the physical characteristics and geometry of the particular simulcast system. In this embodiment, two vectors H1 and L1 are utilized with vector H1 representing the high bits and the L1 representing the low bits of new addresses in memory containing logical steps for writing information to the PTM's 86. That is, for each error or alarm condition from the modems of transceiver 22 at control center 20, there is stored in ROM 88 an ordered set of information to be written to PTM's 86.

RAM 90 functions as a scratch-pad memory in the alarm word comparisons and may also be utilized for other calculations and manipulations. ROM 88 also contains the program associated with the flow chart of FIG. 6.

The PTM's 86 are programmable with information written from ROM 88 to provide programmable frequency outputs of different programmable frequencies depending upon the alarm signal at the PIA inputs. Since each of PTM's 86 has only three output lines, as compared to the 16 input lines of each PIA 84, more than one PTM 86 will ordinarily be used in many simulcast systems as will be more fully appreciated hereinafter. Each PTM 86 provides three programmable frequency outputs in accordance with the information written from ROM 88 by MPU 80 in accordance with the particular alarm word presented to PIA 84. This one-to-one correspondence between the modem alarm signal to PIA 84 and the programmed frequency output signals of PTM 86 can be more readily appreciated from the simplified table in FIG. 8B. Ordinarily, it will be really appreciated by those skilled in the art that there will be more than the two input alarm signals to PIA 84 shown in FIG. 8B and there similarly will be a corresondingly greater set of programmed frequencies from PTM's 86 for each alarm signal or word.

Figure 5:
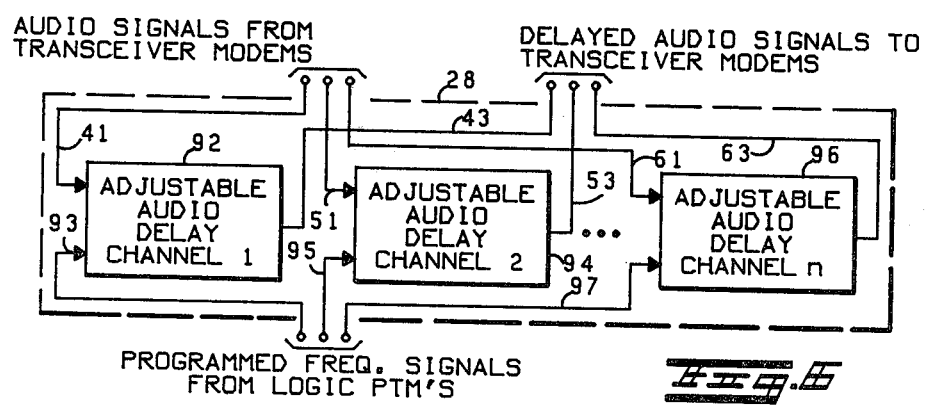
FIG. 5 is a schematic diagram illustrating the circuitry for implementing the logic and storage blocks in FIGS. 1 and 4.

The various interconnections between the logic 24 and storage 26 of FIG. 4 is illustrated in greater detail in FIG. 5, including the address, control and data buses between MPU 80, clock 82, PIA 84, PTM 86, ROM 88 and RAM 90 for the afore-described compatible family of microcomputer components marketed by Motorola Semiconductor Products, Inc.

Each output of PTM's 86 adjustably controls the audio delay of one of the modem channels. That is, for each error word input into PIA 84, a pre-programmed word is written from ROM 88 into PTM 86 to cause PTM 86 to provide a programmed output frequency which is related as a reciprocal to the desired amount of audio delay for the particular modem channel. In this connection, the adjustable audio delay 28 in the control center 20 of FIG. 1 is shown in a block form in FIG. 6. Adjustable audio delay 28 contains a separate adjustable audio delay circuit which is responsive to one of the programmed frequency outputs of PTM 86 for each of the modem channels 1 through n. For example, the adjustable audio delay 92 for channel 1 receives a programmed frequency signal from PTM 86 via an input line 93 and also receives the demodulated audio signal from modem channel 39 on the output line 41 from FIG. 2. Adjustable audio delay 92 will delay the input audio signal on line 41 and provide the delayed audio output signal on line 43 to transceiver 39 in FIG. 2 in accordance with the programmed frequency received from PTM 86 (FIG. 4) on line 93.

In a like manner, an adjustable audio delay 94 will delay an input audio signal from modem 49 for channel 2 on line 51 in accordance with the reciprocal of the programmed frequency received on an input line 95 from PTM 86 and provide the delayed output signal to modem 49 on output line 63. Likewise, an adjustable audio delay 96 associated with channel n will delay the audio signal on input line 61 in accordance with the reciprocal of the programmed frequency on an input line 97 from PTM 86 and provide the delayed audio output signal to modem 59 on an output line 63, the amount of delay preferably being adjustable in about 50 microsecond increments. At least one of adjustable audio delay circuits 92, 94 or 96 could alternatively have an audio input from a dispatcher located at control center 20 or from a remote location via a separate microwave link.

The circuitry for implementing one of the adjustable audio delays 92, 94 or 96 in FIG. 6 is shown in electrical schematic form in FIG. 7. A flip-flop 100 receives the programmed frequency signal from one of the outputs 93, 95 or 97 of PTM 86 and serves to both divide the programmed frequency output by a factor of two and further provides a symmetrical square wave output on an output line 101 since the outputs of PTM 86 may not be a symmetrical square wave. A clock generator portion 102 of adjustable audio delay 92 further divides the signal on line 101 from flip-flop 100 and provides a pair of clocking signals on a pair of output lines 103 and 104 to a bucket brigade device (BBD) 105, the signals on lines 103 and 104 being in approximately 180 degree phase relationship and on 50% duty cycle.

The audio input on line 41 from modem 39 in FIG. 2 is coupled by a capacitor 106 to a transistor 107 which is biased by resistors 108, 109, 110 and 111 into an active mode and, in conjunction with transistor 107, provide an input buffer stage for the audio input signal on line 41 to BBD 105. A coupling capacitor 112 from the emitter of transistor 107 to an input terminal 113 of BBD 105 couples the audio signal from transistor 107 to BBD 105. A resistor 114 connected between input 113 of BDD 105 and a wiper arm of a potentiometer 115 connected between the positive voltage supply and ground is adjustable to control the bias level into terminal 113 of BBD 105.

BBD 105 is commercially available as a self-contained integrated circuit from ITT Semiconductors of Freiburg, West Germany, as Part No. TCA 350 and is specifically designed to delay audio frequency signals by means of variable clock frequency input signals such as those provided on input lines 103 and 104.

The delayed audio output of BBD 105 on an output terminal 117 is buffered by an output buffer stage including a transistor 118, a resistor 119, a resistor 120 and another resistor 121.

The output of transistor 118 at the emitter terminal is coupled by a capacitor 122 into a low-pass Bessel filter 124. Low-pass filter 124 filters any high frequency signals, i.e., those frequencies above 4 KHz from the delayed audio output of BBD 105 which might otherwise by encoded by modem 39 associated with adjustable audio delay 92 as noise or interference into one of the other modem channels and also to attenuate any BBD clock generated noise.

The low-pass filtered and delayed audio signal from low-pass filter 124 is coupled by capacitor 125 into an audio amplifier stage 126, the gain of which is controlled by a variable feedback resistor 127. The output of audio amplifier 126 is presented directly onto delayed audio line 43 into modem channel 1 such that the delayed audio output signal on line 43 compensates for the delay in microwave signal transmission between spatially removed microwave antennas, such as between sites 3 and 4 in FIG. 1. The receiver at site 32 there by receives RF frequency-modulated signals as on path 75 from tower 14 from site 3 and on path 130 from tower 15 at site 4 in phase coherency.

Various other means of adjustably delaying the audio signal from modem 39 on line 41 to provide a delayed audio signal on line 43 to modem 39 will also be apparent to those skilled in the art. For example, rather than the bucket brigade device arrangement of FIG. 7, delta modulation circuitry may be employed to sample the audio signal and compare the audio signal to the previous sample to provide a + or −1 output, to process the digital output of the delta modulation circuit through a digital delay line to get the appropriate delay needed for each microwave link, and to delta demodulate the delayed digital signal to obtain the delayed audio signal, and to supply the delayed audio signal back to the modem. Also, it may be possible to utilize analog-to-digital conversion techniques to convert the audio signal to a digital signal, use a microprocessor to delay the digital signal for the predetermined time interval associated with each mircowave link in the simulcast system, and reconvert the delayed digital signal to an audio signal by digital-to-analog circuitry.

In summary, a simulcast transmission system has been described which automatically provides precise time delays for audio information signals broadcast thereover to maintain signal coherency in overlapping coverage areas. The described system is relatively inexpensive to construct and requires a minimum amount of housing space.

While a particular embodiment of the present invention has been described, it will be obvious to those skilled in the art that changes and modifications may be made without departing from the invention in its broader aspects, and, therefore, the aim of the appended claims is to cover all such changes and modifications as fall within the true spirit and scope of the invention.

I claim:

1. A simulcast transmission system for the simultaneous transmission of information signals comprising:
    a plurality of simulcast transmitter sites, each being located at a predetermined position, and each including means for receiving and retransmitting information signals; and
    control means for establishing transmission links among said simulcast transmitter sites, said control means including means for receiving said information signals and providing a predetermined time delay thereto for each information signal transmitted over a link such that simultaneous transmissions from overlapping coverage area simulcast transmitter sites, each serviced by a different link, are in phase coherency, said control means further comprising means to store the necessary time delay required for each link and for automatically recalling said stored time delay value and provide the required time delay to signals passed over newly established links.

2. The system of claim 1 wherein the means for providing the time delay to said information signals includes a bucket brigade device.

* * * * *